Dec. 29, 1964    J. R. ABBOTT ETAL    3,163,732
ELECTRICALLY FUSED SPRING PACKAGE
Filed Nov. 20, 1961    2 Sheets-Sheet 1

JOHN R. ABBOT
JOHN J. PHILLIPS
INVENTORS.

BY *White and Haughin*

ATTORNEYS

Dec. 29, 1964   J. R. ABBOTT ETAL   3,163,732
ELECTRICALLY FUSED SPRING PACKAGE
Filed Nov. 20, 1961   2 Sheets-Sheet 2

JOHN R. ABBOT
JOHN J. PHILLIPS
INVENTORS.

BY *White and Haefliger*

ATTORNEYS

3,163,732
ELECTRICALLY FUSED SPRING PACKAGE
John R. Abbott, Sherman Oaks, and John J. Phillips, Rolling Hills, Calif., assignors to Gray & Huleguard, Inc., Santa Monica, Calif., a corporation of California
Filed Nov. 20, 1961, Ser. No. 153,291
5 Claims. (Cl. 200—116)

This invention relates generally to electromechanical actuators, and more particularly concerns a novel packaged actuator of the electromechanical type characterized in that the package undergoes rapid expansion in response to the application to the package of a predetermined electrical signal.

It is a major object of the invention to provide an improved actuator package that includes a pair of endwise relatively movable tubular bodies extending in telescopically endwise collapsed relation, together with contained coil spring means operable to expand one or both of the bodies endwise oppositely in response to electrically induced release.

In one form of the invention means is provided for electrically insulating the tubular metallic bodies one from the other while accommodating relative axially displacement thereof so that electrical current may pass through the bodies and through the fusible part to bring about the desired sudden expansion of the bodies. Particular features of the invention which characterize its novelty and usefulness include the provision of terminal means through which the two bodies are electrically energizable, the terminal means including a first terminal fixed to one body and a second terminal having slide contact with the other body, thereby to facilitate or accommodate the body relative expansion. Such features also include a plastic sheath fitting between the tubular bodies for insulating them, at least one coil spring extending coaxially of and within the bodies and in surrounding relation to a pair of central inserts carried by axially spaced body heads, the inserts serving to support a fusible wire extending axially within the bodies and within the coil spring.

In another form of the invention the means for controlling relative endwise expansion of the bodies includes an electrically energizable release and latching means responsive to such release and to spring generated loading transmitted in such manner as to unlatch the latching means, thereby freeing the bodies for endwise separation as a result of sufficient electrical energization of the release. One form of such latching means may comprise a series of disengageable shoulders carrying the bodies and in such latching engagement that the spring generated loading is transmitted through the engaged shoulders. The release may then act to hold the shoulders against disengagement until electrical energization of the release, and as will be described the latter may comprise a metallic hoop or part thereof which extends at least part way about the outer tubular body and is subject to electrically induced lengthening to release the latch shoulder engagement.

These and other objects and advantages of the invention, as well as the details of an illustrative embodiment, will be more fully understood from the following detailed description of the drawings, in which.

Figure 1:
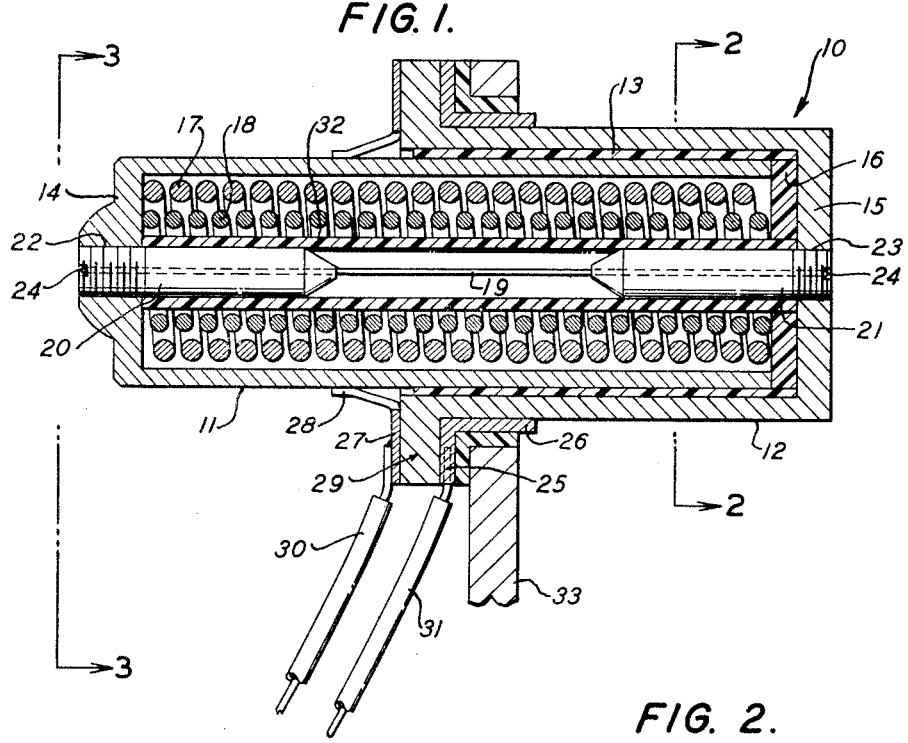
FIG. 1 is a section taken through the package prior to expansion thereof.
Figure 2:
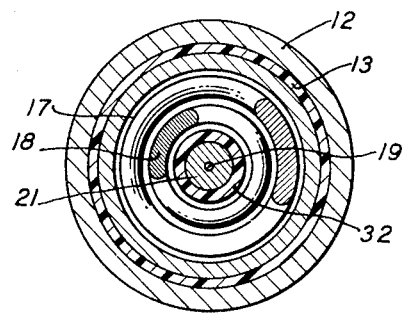
FIG. 2 is a section taken on line 2—2 of FIG. 1.
Figure 3:
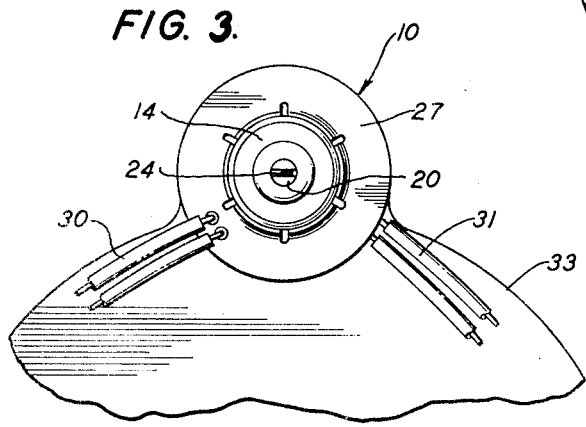
FIG. 3 is an end view taken on line 3—3 of FIG. 1.

In the drawings the electromechanical actuator package illustrated comprises an assembly 10 including a pair of electrically conductive tubular metallic bodies 11 and 12 extending in telescopically endwise collapsed relation, one partly within the other. A plastic sheath 13 is one form of means for electrically insulating the bodies one from the other while accommodating relative axial displacement thereof, the sheath surrounding the portion of the body 11 extending within the body 12.

The two bodies 11 and 12 include axially spaced heads 14 and 15 integral with the respective bodies 11 and 12, an annular insulator 16 being received within the body 12 and against the head 16. A pair of endwise compressed coil springs 17 and 18 is contained within the bodies, opposite ends of the coil springs bearing against the head 14 and the insulator plate 16 respectively, the coil springs exerting loading tending relatively to expand the two bodies 11 and 12 from collapsed relation.

Such expansion is resisted by release means such as may include an electrically responsive fusible part confined within a space between the body heads 14 and 15 and through which reaction loading is transmitted. Furthermore, the means referred to is electrically conductive and connected in series between the two bodies 11 and 12. More specifically, the electrically fusible part may comprise an axially extending wire 19 as shown, and the means through which reaction loading is transmitted typically includes axially spaced inserts 20 and 21 carried by the heads 14 and 15 as by the thread connections shown at 22 and 23. The inserts in turn support axially spaced portions of the wire 19, the latter being gripped or clamped and preferably brazed to the insert material. Alternately the wire may have swaged end fittings 24 as shown to connect to the inserts.

The assembly also includes terminal means through which the bodies are electrically energizable, the terminal means being carried on one of the bodies and including a first terminal remaining in fixed position relative to the one body and a second terminal having slide contact with the other body. As an example of this, FIG. 1 shows a first terminal 25 remaining in fixed position relative to body 12 and having contact therewith at 26, and a second terminal or contact ring 27 having slide contact at 28 with the body 11. Both terminals are carried by the body 12, but are insulated from each other at 29. Suitable lead wires are shown at 30 and 31 for connection to the two terminals.

FIG. 1 also shows a tubular insulator or sheath, typically plastic, extending coaxially of and within the coil spring means at 32, this insulator extending about the inserts and the wire in order to insulate them from the coil springs.

In operation, application of sufficient electrical current through the lead wires results in the flow of electricity in series sequence through terminal 27, body 11, head 14, insert 20, wire 19, insert 21, head 15, body 12, and terminal 25, or vice versa depending upon the direction of current flow. Sufficient current results in the fusion of the wire 19 at a location between the two inserts 20 and 21, thereby releasing the package for coil spring urged sudden expansion of the body 11 relative to the body 12. Accordingly, if the body 12 is fixed as by the support 33, the body 11 will suddenly move axially away from the body 12 for actuation purposes.

Figure 4:
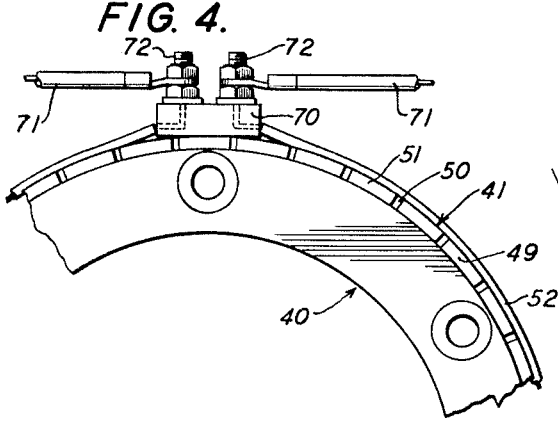
FIG. 4 is a fragmentary end view of another form of the actuator package.
Figure 6:
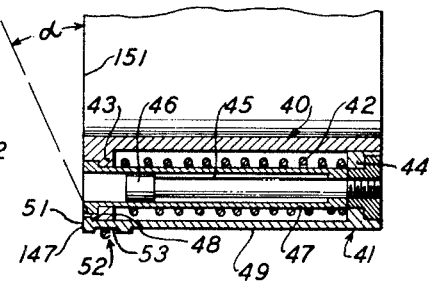
FIG. 6 is a side elevation in section through the FIG. 4 package prior to axial expansion.
Figure 5:
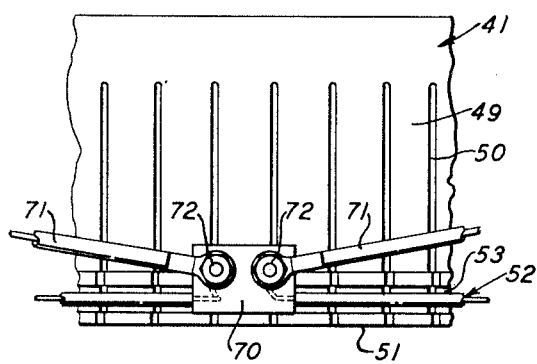
FIG. 5 is a fragmentary top plan view of the FIG. 4 package.

Referring now to the modified package of FIGS. 4-7, inner and outer coaxial tubular bodies are shown at 40 and 41, FIG. 4 showing the bodies in telescopically collapsed relation and FIG. 5 showing them after spring urged expansion. Spring means for accomplishing such expansion is shown to comprise a series of coil springs 42 having generally endwise parallel axes and spaced peripherally about the inner one 40 of the bodies and generally within the outer body 41, at least when the two are endwise collapsed. Force is transmitted from the springs to the said bodies typically but not necessarily through end flanges 43 and 44 respectively integral therewith. Expansion and contraction of the springs in generally parallel alignment is typically secured by providing guide means generally designated at 45. The latter may comprise telescopic guides or guide members as for example the piston and cylinder guide members 46 and 47 shown as respectively integral with the end flanges 44 and 43 respectively and as projecting within the spring coils.

Means is provided for controlling relative endwise expansion of the generally tubular bodies 40 and 41, said means including an electrically energizable release and latching means responsive to the release and to spring generated loading transmitted in such manner as to unlatch the latching means thereby freeing the bodies for endwise separation as a result of sufficient electrical energization of the release. Referring first to the latching means, it typically comprises a series of disengageable shoulders, one form of which is shown at 147 and 48 on the bodies 40 and 41 respectively. The shoulders 48 are formed on cantilever type sections or fingers 49 of the outer body 41, which sections are defined by parallel slots 50 extending in generally axial radial planes and cut into the terminal end 51 of the outer body. Engagement shoulders 47 and 48 are generally frusto-conical, with the former formed on the end flange 43 of the outer body.

The shoulders 47 and 48 are carried in such latching engagement that spring generated loading is transmitted therethrough, and it is characteristic of the frusto-conical angularity $\alpha$ of the shoulders with respect to radial lines 151 that the shoulders tend to separate or disengage under such load transmission, in the absence of holding force opposing such disengagement. Such separation is typically facilitated by resilient outward bending of the cantilevered sections 49 of the outer body 41, which serves to unlatch the shoulders 47 and 48 permitting relative axial expansion of the tubular bodies.

Further in accordance with the invention, the necessary holding force referred to is provided by electrically energizable release means, one form of which is shown as comprising a wire member 52 extending hooplike about the sections 49 and within a groove 53 therein. The wire may comprise copper, or a copper alloy, or other suitable material of such length and size in relation to the dimensions of the sections 49 and the angularity of the shoulders 47 and 48 that the wire will expand sufficiently in response to current flow therethrough and allow outward deflection of the sections 49, unlatching the shoulders. It is an important feature of the invention that a relatively small wire release is enabled to resist or control the sudden unlatching or releasing of relatively high spring generated loads, say on the order of 200 pounds and up. FIG. 4 shows the ends of the wire 52 interconnected by a terminal block 70 to which glass fiber covered leads 71 are connected as by terminals 72.

Figure 8:
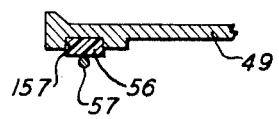
FIG. 8 is a section taken through a modified latching means and release.

The release may be generally characterized as expansible and hooplike. Other forms thereof being shown in FIGS. 8 and 9. In FIG. 8 the release includes a nylon or other thermoplastic ring 56 in the groove 157 formed in sections 49, with a current heatable element 57 in heat transfer relation with the ring 56. Upon electrical energization of the element 57 and sufficient heating thereof the ring 56 will soften leading to release of the shoulders 47 and 48 as a result of outward deflection of section 49. In this regard, the ring 56 may be regarded as "electrically energizable" in the sense that it expands due to electrically induced heating thereof.

Figure 9:
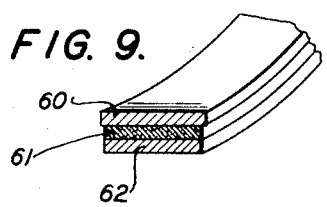
FIG. 9 is a perspective showing of another form of release.
Figure 7:
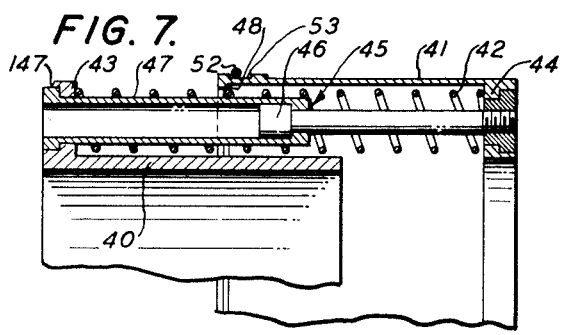
FIG. 7 is a fragmentary side elevation of the FIG. 4 package after its expansion.

FIG. 9 shows another form of release characterized as including a metal band 60 which extends around the sections 49 (not shown) the band being endwise expansible due to electrically induced heating thereof. For this purpose, a carbon or other electrical heating element 61 is held in contact with the band outer surface by a retainer or backer member 62.

Figure 10:
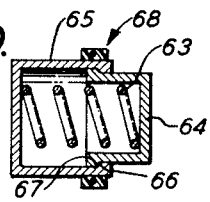
FIG. 10 is a side elevation through still another form of package.

Finally, FIG. 10 shows another form of the package wherein a single coil spring 63 urges tubular bodies 64 and 65 endwise oppositely. Shoulders 66 and 67 on the bodies 64 and 65 are held in interengagement by a release 68, thereby to prevent endwise expansion of the bodies until electrical energization of the release. The latter may comprise an electrically energizable heating element embedded within a heat expansible band, which extends hooplike about the skirt of the outer tubular body, as shown.

In various forms of the invention release may be accomplished through general or local thermal expansion, melting, or stretching of the wire loop, or its equivalent, said stretching resulting from reduction in yield strength of the loop material through temperature increase. Also, the invention contemplates temperature change induced release of hoop tension for freezing relative linear or rotary movement of bodies normally restrained by said hoop tension. The hoop may include a local section releasable in response to temperature change, as by electrically induced fusion.

We claim:

1. An electromechanical actuator package, comprising a pair of endwise relatively movable bodies extending in endwise collapsed relation and defining an endwise extending axis, spring means exerting loading tending to relatively oppositely bodily move said bodies, and means for controlling said body relative movement by said spring means and including a series of endwise extending cantilever fingers on one body and spaced about said axis, the fingers and the other body having cam shoulders in latching interengagement holding the bodies against relatively opposite bodily movement, the shoulders having cam angularity with respect to said axis to transmit force tending to flex the fingers with respect to said axis and thereby release said latching interengagement, and means extending about said axis and controllably blocking and unblocking said flexing of the fingers and including an electrically energizable element operable to effect unblocking of finger flexing.

2. The package of claim 1 in which said last named means is hooplike and expansible in response to electrical energization of said element.

3. The package of claim 1 in which said element comprises a current responsive expansible wire.

4. The package of claim 1 in which said last named means is located proximate the terminals of said fingers.

5. The package of claim 4 in which the spring means is confined inwardly of said fingers.

References Cited by the Examiner

UNITED STATES PATENTS

| | | | |
|---|---|---|---|
| 1,814,246 | 7/31 | Doring | 200—78 |
| 1,990,122 | 2/35 | Hauser | 200—116 |
| 2,117,703 | 5/38 | Cohen | 200—116 |
| 2,244,788 | 6/41 | Lindell et al. | 200—117 |
| 2,453,396 | 11/48 | Yonkers | 200—117 |
| 2,491,956 | 12/49 | Curry | 200—117 |
| 2,811,612 | 10/57 | Atkinson | 200—78 |
| 2,821,602 | 1/58 | Hordechuck | 200—123 |
| 3,022,402 | 2/62 | Arey | 200—113 |

FOREIGN PATENTS

| | | |
|---|---|---|
| 180,824 | 6/22 | Great Britain. |
| 425,492 | 3/35 | Great Britain. |

BERNARD A. GILHEANY, *Primary Examiner.*

ROBERT R. BUNEVICH, *Examiner.*